(12) United States Patent
Spaggiari et al.

(10) Patent No.: US 8,051,823 B2
(45) Date of Patent: Nov. 8, 2011

(54) COMBINED ACTUATOR WITH RHEOLOGICAL CONTROL BRAKE

(75) Inventors: Andrea Spaggiari, Reggio Emilia (IT); Eugenio Dragoni, Lugo (IT); Nazario Bellato, Bologna (IT); Michele Pecora, Potenza (IT); Federico Lancioni, Sangemini (IT); Stefano Fornara, Modena (IT); Andrea Baldassari, Bologna (IT)

(73) Assignee: Magneti Marelli Powertrain S.p.A. (IT)

( * ) Notice: Subject to any disclaimer, the term of this patent is extended or adjusted under 35 U.S.C. 154(b) by 434 days.

(21) Appl. No.: 12/269,318

(22) Filed: Nov. 12, 2008

(65) Prior Publication Data

US 2009/0127484 A1     May 21, 2009

(30) Foreign Application Priority Data

Nov. 14, 2007   (EP) .................................. 07425722

(51) Int. Cl.
*F02D 7/00* (2006.01)
(52) U.S. Cl. .......... 123/184.61; 123/184.51; 251/129.15
(58) Field of Classification Search ............. 123/184.21, 123/184.22, 184.26, 184.31, 184.36, 184.42, 123/184.49, 184.54, 184.61, 568.24–568.3; 60/435, 436; 188/24.22; 251/33, 38, 129.15
See application file for complete search history.

(56) References Cited

U.S. PATENT DOCUMENTS

| | | | |
|---|---|---|---|
| 3,361,269 A | | 1/1968 | Peterson |
| 4,930,463 A | * | 6/1990 | Hare, Sr. .................... 123/90.11 |
| 5,083,494 A | * | 1/1992 | Dautremay .................... 91/361 |
| 5,103,779 A | * | 4/1992 | Hare, Sr. .................... 123/90.11 |
| 5,921,151 A | * | 7/1999 | Louis et al. ................. 74/606 R |
| 6,234,060 B1 | | 5/2001 | Jolly |
| 6,439,364 B1 | * | 8/2002 | Mies ............................ 192/221 |
| 2002/0189888 A1 | * | 12/2002 | Magnus et al. .............. 180/402 |
| 2008/0066708 A1 | * | 3/2008 | Maruyama et al. ...... 123/184.21 |
| 2009/0298635 A1 | * | 12/2009 | Kuras et al. .................... 475/53 |

FOREIGN PATENT DOCUMENTS

| | | |
|---|---|---|
| EP | 1 770 264 A1 | 4/2007 |
| FR | 1061685 | 12/1953 |
| GB | 983103 | 2/1965 |

OTHER PUBLICATIONS

European Search Report dated Apr. 25, 2008, issued in corresponding priority European Application No. 07425722.1.

* cited by examiner

*Primary Examiner* — John T. Kwon
*Assistant Examiner* — Johnny H Hoang
(74) *Attorney, Agent, or Firm* — Ostrolenk Faber LLP

(57) ABSTRACT

A combined actuator provided with: a mobile element; a driver for displacing the mobile element; and a rheological control brake, which is mechanically coupled to the mobile element to adjust the displacement of the mobile element; the rheological control brake has: two contiguous adjustment chambers; a rheological fluid contained in the two adjustment chambers; a sliding piston, which tightly separates the two adjustment chambers and is mechanically connected to the mobile element; at least one external connection pipe, which reciprocally connects the two adjustment chambers; and a driving device which is coupled to the external connection pipe so as to apply a variable electromagnetic field to the rheological fluid contained in the external connection pipe for varying the viscosity of the rheological fluid between a minimum value and a maximum value.

13 Claims, 6 Drawing Sheets

COMBINED ACTUATOR WITH RHEOLOGICAL CONTROL BRAKE

TECHNICAL FIELD

The present invention relates to a combined actuator with rheological control brake.

The present invention is advantageously applied to an actuator for an internal combustion engine, to which explicit reference will be made in the following description without therefore loosing in generality.

BACKGROUND ART

A modern internal combustion engine comprises a number of servo controlled actuators, which are controlled by an electronic control unit to automatically modify the position of corresponding engine adjustment or control members.

When an adjustment or control member is to be moved only between two limit positions, i.e. when the adjustment or control member is to take only two positions, non-progressive actuators are used, which may be either electric actuators or non-balanced pneumatic/hydraulic actuators (the choice depends on requirements of cost, size, power and speed).

When the adjustment or control member is to be able to take all the positions comprised between two limit positions, progressive actuators, such as electric or balanced pneumatic/hydraulic actuators, are used (the choice depends on requirements of cost, size, power and speed). In the case of small or medium powers, both the electric actuators and the balanced pneumatic/hydraulic actuators are particularly expensive and cumbersome; specifically, the electric actuators are cumbersome and expensive also due to the presence of control electronics, while the pneumatic/hydraulic actuators are cumbersome and expensive due to the presence of solenoid valves and pneumatic/hydraulic circuits thereof.

Patent application EP1770264A1 describes a progressive displacement control actuator comprising an element which moves along a linear path, a pneumatic or hydraulic driver for displacing the mobile element along the linear path, an adjustment chamber, which accommodates part of the mobile element and is filled with a rheological liquid, and a driving device, which is adapted to apply a variable voltage to the rheological liquid contained in the adjustment chamber to vary the viscosity of the rheological liquid between a minimum value, at which the displacement of the mobile element is essentially free, and a maximum value, at which the displacement of the mobile element is blocked.

U.S. Pat. No. 6,234,060B1 describes a progressive displacement control actuator comprising an element which moves along a circular path, a pneumatic driver for displacing the mobile element along the circular path, an adjustment chamber, which accommodates part of the mobile element and is filled with a rheological liquid, and a driving device, which applies a variable voltage to the rheological liquid contained in the adjustment chamber to vary the viscosity of the rheological liquid between a minimum value, at which the displacement of the mobile element is essentially free, and a maximum value, at which the displacement of the mobile element is blocked.

The progressive displacement control actuators described in patent application EP1770264A1 and in U.S. Pat. No. 6,234,060B1 are relatively complex and expensive, do not allow to obtain a particularly accurate control of the position of the mobile element along the corresponding path and present relatively low energy efficiency and response promptness.

DISCLOSURE OF INVENTION

It is the object of the present invention to provide a combined actuator with rheological control brake which is free from the above-described drawbacks and which is easy and cost-effective to manufacture.

According to the present invention, a combined actuator with rheological control brake is provided as claimed in the attached claims.

BRIEF DESCRIPTION OF THE DRAWINGS

The present invention will now be described with reference to the accompanying drawings, which illustrate a non-limitative embodiment thereof, in which.

PREFERRED EMBODIMENTS OF THE INVENTION

Figure 1:
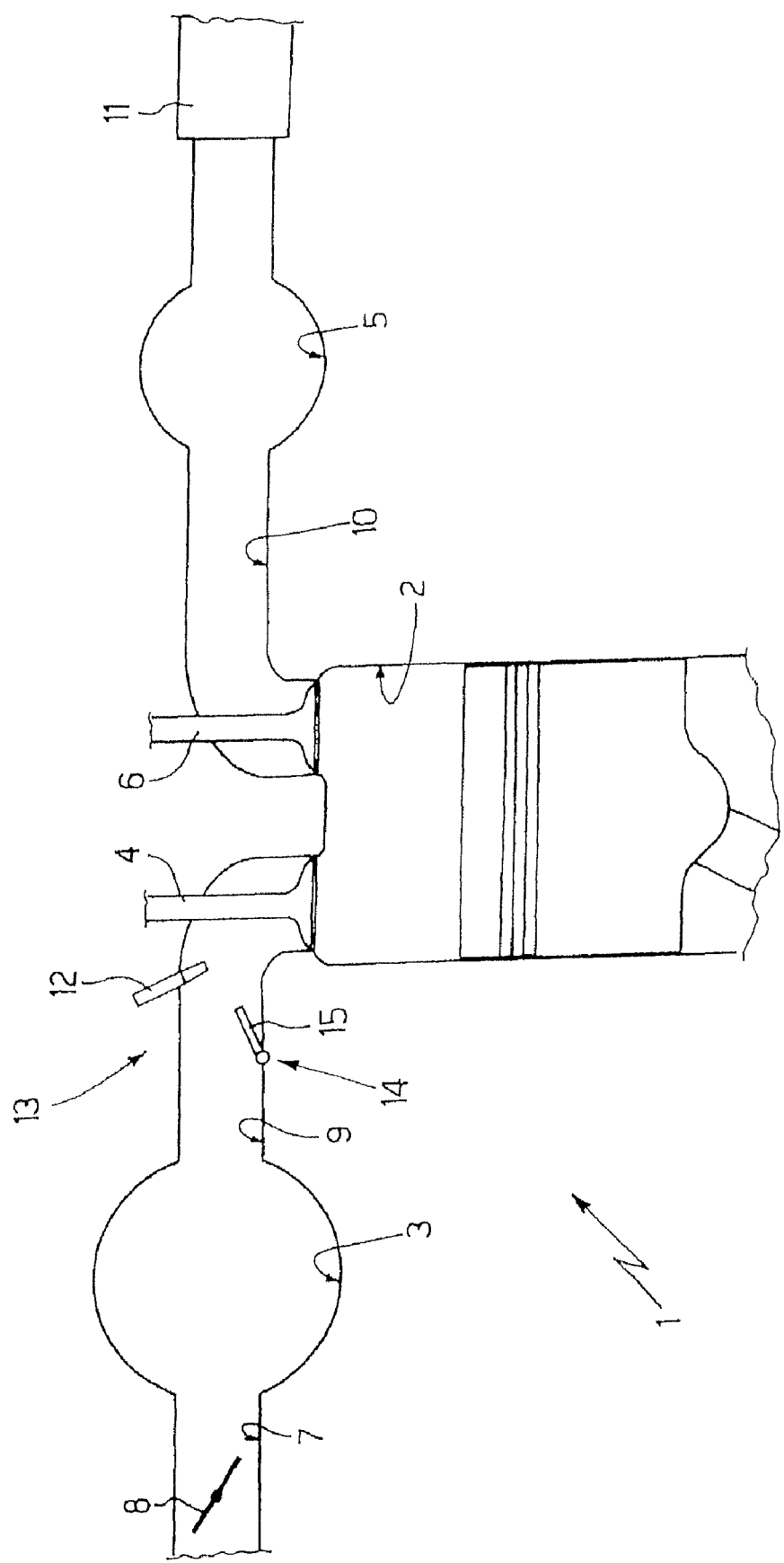
FIG. 1 is a diagrammatic view of an internal combustion engine provided with a choking device of the tumble type which is driven by a combined actuator with rheological control brake made according to the present invention.

In FIG. 1, numeral 1 indicates as a whole an internal combustion engine provided with four cylinders 2 (only one of which is shown in FIG. 1), each of which is connected to an intake manifold 3 by means of at least one intake valve 4 and to an exhaust manifold 5 by means of at least one exhaust valve 6.

The intake manifold 3 receives fresh air (i.e. air from the external environment) through a feeding pipe 7 adjusted by a butterfly valve 8 and is connected to cylinders 2 by means of corresponding intake pipes 9 (only one of which is shown in FIG. 1), each of which is adjusted by the corresponding intake valve 4. Similarly, the exhaust manifold 5 is connected to the cylinders 2 by means of corresponding exhaust pipes 10 (only one of which is shown in FIG. 1), each of which is adjusted by the corresponding exhaust valve 6. An exhaust pipe 11, which ends with a muffler (known and not shown) for releasing the combustion gases into the atmosphere originates from the exhaust manifold 5.

According to the illustrated embodiment, the fuel (e.g. gasoline, diesel, methane, LPG, etc.) is injected into each intake pipe 9 by means of an injector 12 arranged near the intake valve 4. According to a different embodiment (not shown), the injectors 12 are arranged so as to directly inject the fuel into each cylinder 2.

Figure 2:
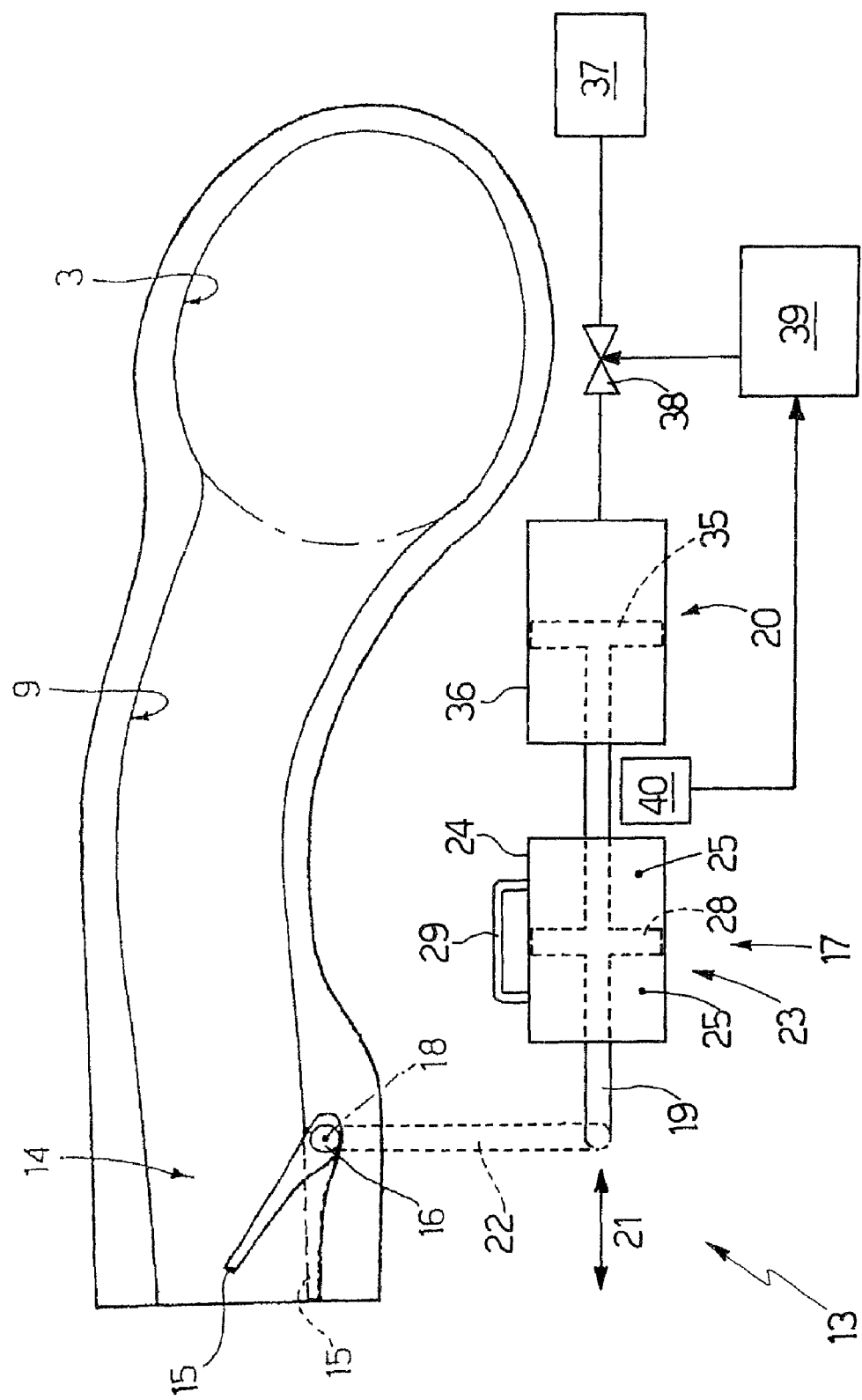
FIG. 2 is a diagrammatic view of the combined actuator with rheological control brake in FIG. 1.

The intake manifold 3 comprises a choking device 13 of the tumble type, which varies the cross section of the intake pipes 9 according to the speed of the engine 1. As shown in FIG. 2, the choking device 13 comprises, for each intake pipe 9, a choking valve 14 which has a choking body 15 keyed on a shaft 16 to rotate under the bias of an actuator 17 about a rotation axis 18 arranged transversally with respect to the corresponding intake pipe 9.

Preferably, a single common actuator 17 is provided, which is mechanically connected to all the choking bodies 15 of the four choking valves 14. Alternatively, each choking valve 14 may comprise its own actuator 17 and thus be mechanically independent from the other choking valves 14; in other words, the choking bodies 15 of the four choking valves 14 may not be mechanically connected together and may be thus free to rotate freely with respect to each other.

In use, each choking body 15 rotates under the bias of the actuator 17 between an active position (shown by a solid line in FIG. 2), in which the choking body 15 reduces the air introduction section of the intake pipe 9, and a home position (shown by a broken line in FIG. 2), in which the choking body 15 does not determine any reduction of the air introduction section of the intake pipe 9.

According to a different embodiment (not shown) each intake pipe 9 comprises two channels and a choking device of the swirl type, which is adapted to vary the section of the intake pipes 9 according to the engine speed by adjusting four choking valves arranged inside the corresponding channels of the four intake pipes 9, is provided instead of the choking device 13 of the tumble type.

As shown in FIG. 2, the actuator 17 comprises a mobile element 19 (one linear rod in the embodiment shown in FIG. 2) and a pneumatic driver 20 for displacing the mobile element 19 along a linear path 21. One end of the mobile element 19 is secured to an end of the shaft 16 by means of a rigid arm 22 which constitutes a mechanical transmission for transforming the linear movement of the mobile element 19 into a rotary movement which rotates the shaft 16 about the rotation axis 18.

The actuator 17 further comprises a rheological control brake 23, which is mechanically coupled to the mobile element 19 to adjust the displacement of the mobile element 19 along the path 21; in other words, the rheological control brake 23 is adapted to modify the law of motion imparted to the mobile element 19 by the driver 20.

Figure 3:
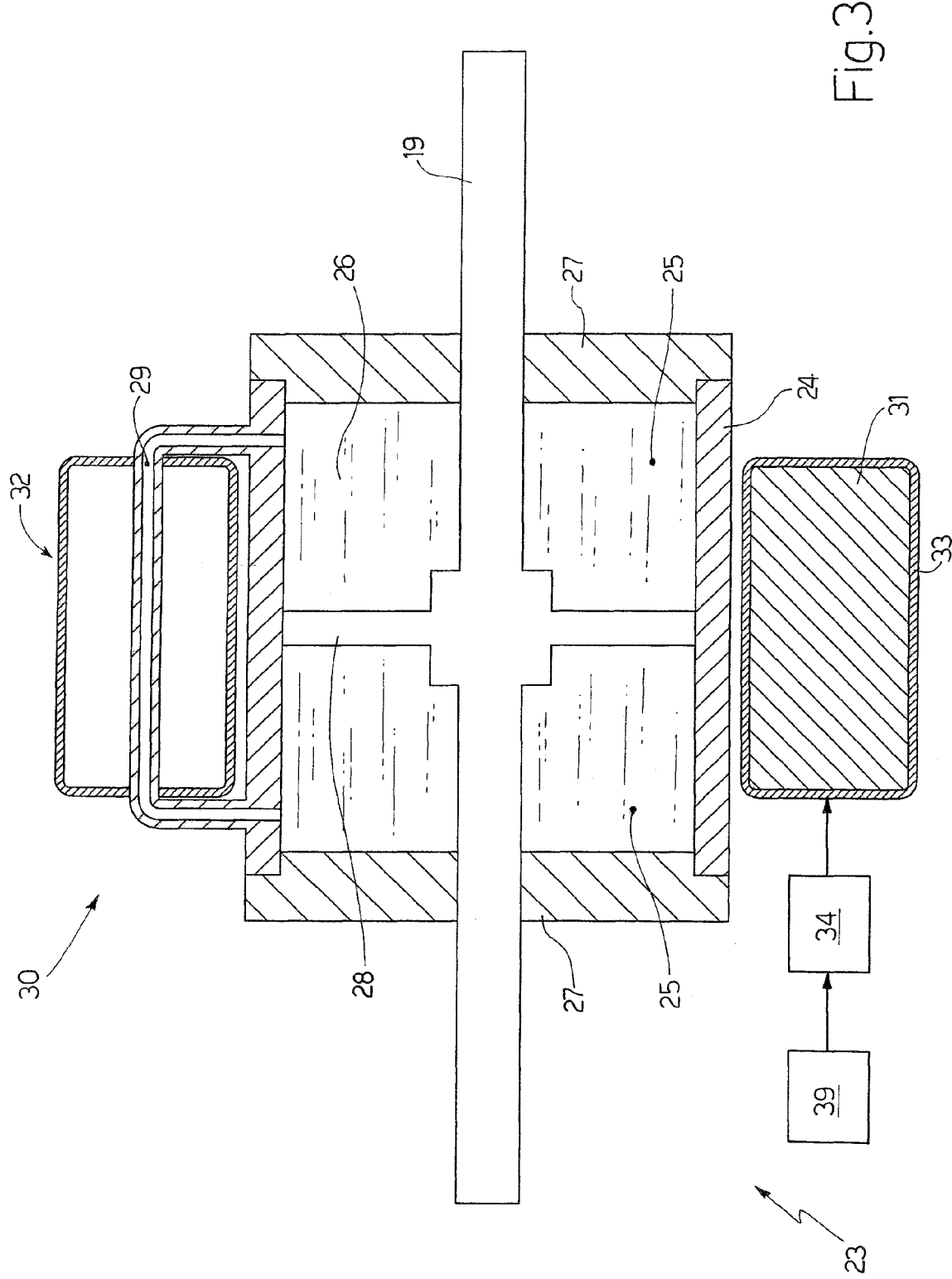
FIG. 3 is a diagrammatic sectional view with parts removed for clarity of a rheological control brake of the combined actuator in FIG. 2.
Figure 4:
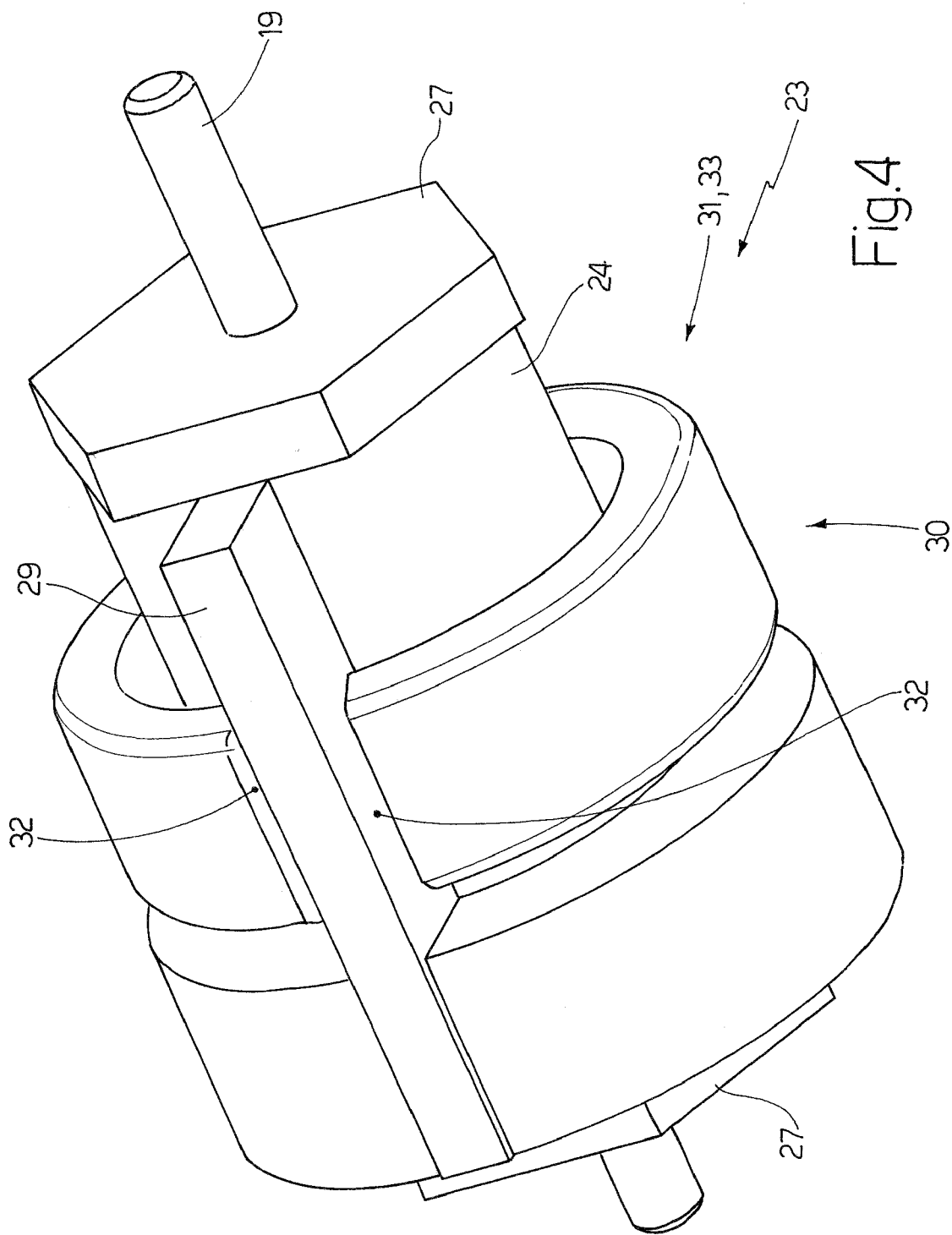
FIG. 4 is a diagrammatic perspective view of the rheological control brake in FIG. 3.
Figure 5:
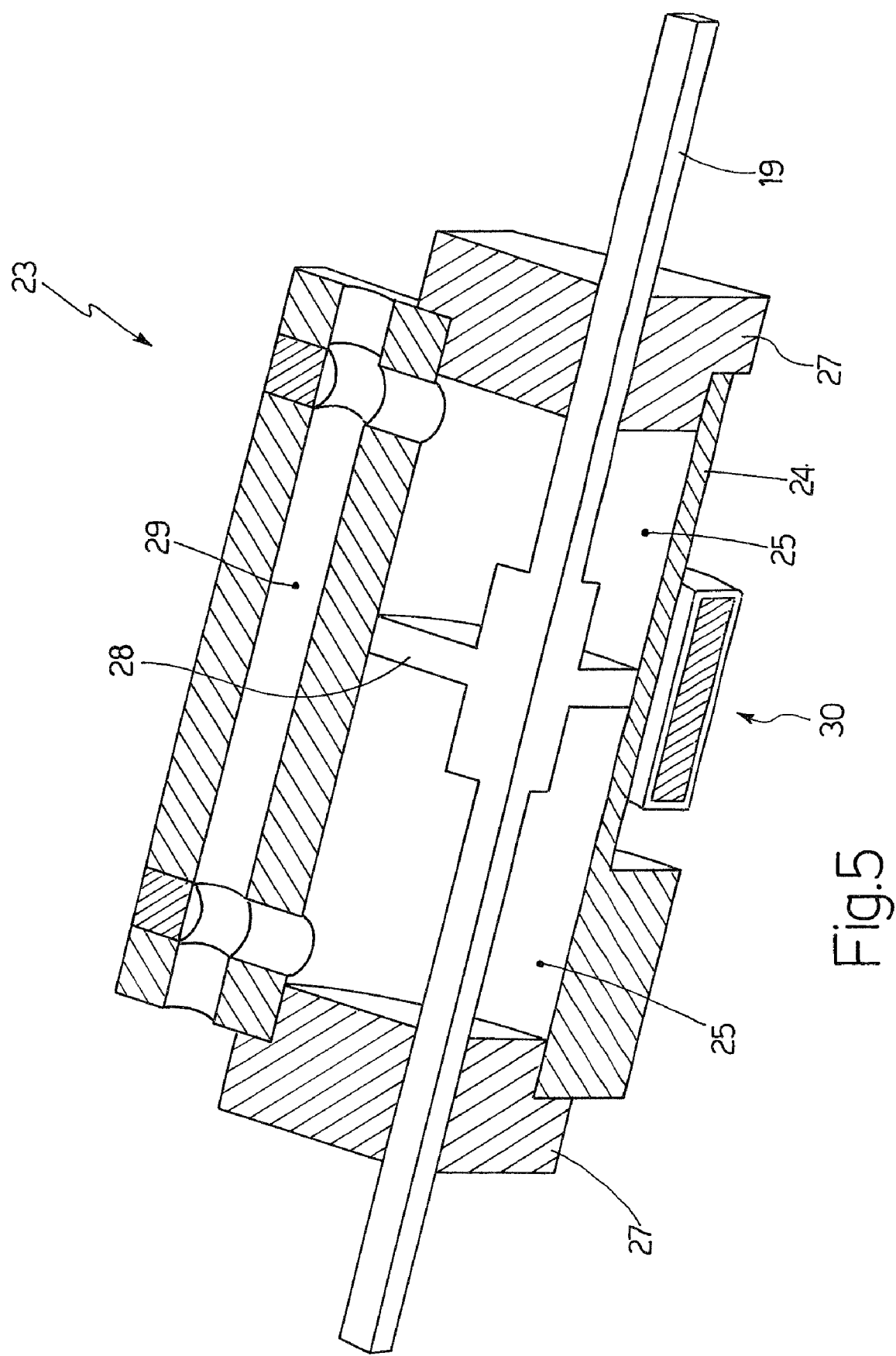
FIG. 5 is a partially sectional, diagrammatic, perspective view with parts removed for clarity, of the rheological control brake in FIG. 3.

As shown in FIG. 3, the rheological control brake 23 comprises a cylindrical tubular body 24 in which two contiguous adjustment chambers 25 which are filled with a rheological fluid 26 are defined. Each adjustment chamber 25 is delimited by a cap 27 sealed to the tubular cylindrical body 24 outside and by a sliding piston 28 inside, which tightly separates the two adjustment chambers 25 and is mechanically connected to the mobile element 19 to integrally move with the mobile element 19 itself. The displacement of the mobile element 19 determines a similar displacement of the piston 28 and therefore causes a reduction of volume in an adjustment chamber 25 and a corresponding increase of volume in the other adjustment chamber 25.

The tubular body 24 has at least one external connection pipe 29, which reciprocally connects the two adjustment chambers 25 and is arranged outside the two adjustment chambers 25 themselves; preferably, the external connection pipe 29 is arranged outside the tubular body 24 and is formed by non-magnetic material, i.e. essentially free from ferromagnetic features. The presence of the external connection pipe 29 is necessary to allow the displacement of the piston 28 and thus the displacement of the mobile element 19 integral with the piston 28; indeed, the displacement of the piston 28 causes a volume reduction in an adjustment chamber 25 and a corresponding volume increase in the other adjustment chamber 25 and such variation in volumes in the two adjustment chambers 25 is only possible if a similar flow of rheological fluid 26 between the two adjustment chambers 25 occurs because the rheological fluid 26 is essentially incompressible, as all fluids.

Finally, the rheological control brake 23 for the adjustment chambers 25 comprises a driving device 30 which is coupled to the external connection pipe 29 so as to apply a variable magnetic field to the rheological fluid 26 contained in the external connection pipe 29 for varying the viscosity of the rheological fluid 26 between a minimum value (zero magnetic field), at which the rheological fluid 26 may freely flow through the external connection pipe 29, and a maximum value (magnetic field of maximum intensity), at which the rheological fluid 26 may not flow through the external connection pipe 29.

According to the preferred embodiment shown in the accompanying figures, the rheological fluid 26 is magnetorheological, i.e. varies its viscosity according to the magnetic field to which it is subjected and specifically increases its viscosity as the magnetic field to which it is subjected increases; in this case, the driving device 30 is adapted to apply a variable magnetic field to the rheological fluid 26 contained in the external connection pipe 29. According to a different embodiment (not shown), the rheological fluid 26 is electrorheological, i.e. varies its viscosity according to the electric field to which it is subjected and specifically increases its viscosity as the electric field to which it is subjected increases; in this case, the driving device 30 is adapted to apply a variable electric field to the rheological fluid 26 contained in the external connection pipe 29.

The driving device 30 comprises a ferromagnetic core 31 having a gap 32 in which the external connection pipe 29 is arranged. Furthermore, the driving device 30 comprises a winding 33 which is coupled to the ferromagnetic core 31 (i.e. is wound about the ferromagnetic core 31), and an electric generator 34 connected to the winding 33 to make an electric current of adjustable intensity circulate in the winding 33 so as to generate a magnetic field of adjustable intensity in the ferromagnetic core 31.

According to a preferred embodiment shown in FIGS. 3-6, the ferromagnetic core 31 is open-ring-shaped having an interruption which defines the gap 32 at the external connection pipe 29; furthermore, the open-ring-shaped ferromagnetic core 31 is arranged about the tubular body 24 and is thus arranged about the adjustment chambers 25 within the tubular body 24. Preferably, the ferromagnetic core 31 and the adjustment chambers 25 have a circular cross section and are reciprocally coaxial.

Figure 7:
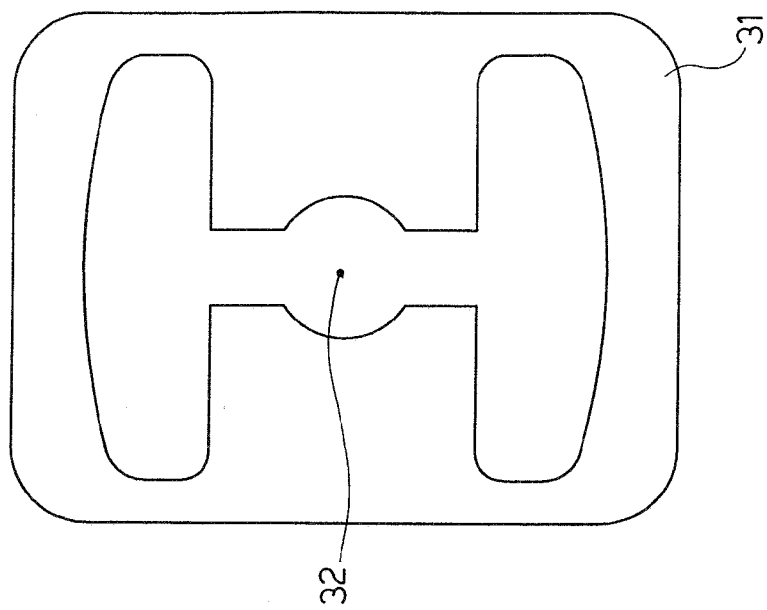
FIG. 7 is a plan view of an alternative embodiment of the ferromagnetic core in FIG. 6.
Figure 6:
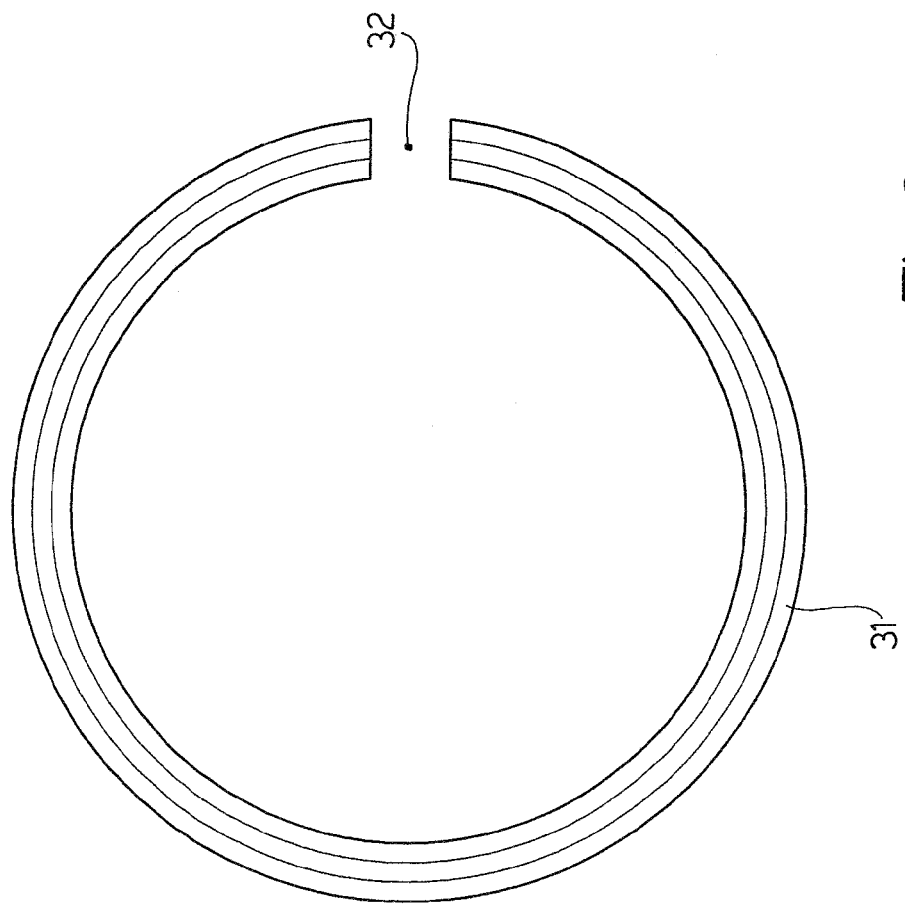
FIG. 6 is a plan view of a ferromagnetic core of the rheological control brake in FIG. 3.

According to an alternative embodiment shown in FIG. 7, the ferromagnetic core 31 displays a double "C" shape having a central gap 32; in this case, the ferromagnetic core 31 is arranged laterally with respect to the tubular body 24 and thus with respect to the adjustment chambers 25.

As previously mentioned, the external connection pipe 29 is made of non-magnetic material so as to prevent the magnetic field from concentrating on the wall of the connection pipe 29 and thus either not concerning, or only marginally concerning, the rheological fluid 26 inside the connection pipe 29.

As shown in FIG. 2, the driver 20 is pneumatic and comprises a piston 35 mechanically connected to the mobile element 19 and a pneumatic cylinder 36 for displacing the piston 35 itself. The cylinder 36 is connected to a compressed air feeding device 37 (e.g. consisting of a compressed air tank maintained pressurized by a compressor) by means of a solenoid valve 38 controlled by a control unit 39. According to a different embodiment (not shown) the pneumatic driver 20 is replaced by an equivalent hydraulic driver. If the driver 35 is provided with a single cylinder 36 (as shown in the embodiment in FIG. 2), then the piston 35 is also accompanied by a spring (not shown) to ensure the movement of the piston 35 itself in the two directions.

A sensor 40 detects the position and/or speed of the mobile element 19 instant-by-instant and communicates such position and/or speed to the control unit 39. According to the embodiment shown in FIG. 2, the sensor 40 is coupled to the mobile element 19 and thus directly detects the position of the mobile element 19 itself. According to a different embodiment (not shown), the sensor 40 is an angular encoder mechanically coupled to the shaft 16 which receives the motion from the mobile element 19; consequently, the sensor 40 indirectly detects the position of the mobile element 19 by detecting the position of the shaft 16 which is mechanically connected to the mobile element 19 itself.

In order to displace the mobile element 19 (i.e. the shaft 16) from a current initial position to a target final position, the control unit 39 activates the driver 20 by means of the solenoid valve 38 to move the mobile element 19 towards the final position; at the same time, the control unit 39, by means of the driving device 30, applies a variable magnetic field to the rheological fluid 26 contained in the connection pipe 29 for varying the viscosity of the rheological fluid 26 and taking the viscosity of the rheological fluid 26 to a maximum value at which the displacement of the mobile element 19 is blocked when the mobile element 19 itself reaches the final position. By using the position and/or speed information of the mobile element 19 supplied by the sensor 40, the control unit 39 feedback controls the magnetic field applied to the rheological fluid 26 in the connection pipe 29; as feedback variable, the control unit 39 may use the position and/or speed of the mobile element 19. The choice of the feedback variable to be used obviously depends on the static and dynamic performances of the system.

If needed, the control unit 39 varies the magnetic field applied to the rheological fluid 26 in the connection pipe 29 so as to vary the viscosity of the rheological fluid 26 to make the mobile element 19 follow a predetermined target speed profile.

The discovery of magnetorheological fluids and the first studies on their behavior were conducted by Jacob Robinow, researcher at the US National Bureau of Standards at the end of the forties. Magnetorheological fluids belong to the so-called smart materials or mechatronic materials in virtue of their high chemical-physical features which may be electrically varied; such materials may indeed vary their rheological behavior according to the applied magnetic field.

This property is not limited only to magnetorheological fluids; there is indeed another category which can change its rheological features: it consists of fluids sensitive to electrical field variations which, for such a reason, are called electrorheological fluids.

For both magnetorheological and electrorheological fluids the transformation from liquid state to gelatinous state occurs simply, rapidly and above all reversibly. In absence of magnetic field, the magnetorheological fluid behaves as a fluid with viscosity like that of an oil, while, after applying the field, the magnetorheological fluid takes a semi-solid consistency. The change of state occurs suddenly (in the order of few milliseconds).

Magnetorheological fluids mainly consist of a base liquid, generally an oil, in which fine polarizable particles of ferromagnetic material are suspended; more rarely, the suspension liquid is an aqueous solution. The suspended particles have a micrometric size usually between 1-10 μm.

A magnetic moment is induced in presence of an external magnetic field on the ferromagnetic particles. The magnetic interaction between the dipoles of the particles leads the system to an energetic state of non-balance; consequently the particles will tend to move and re-arrange themselves to revert the system to a new minimum energy configuration. An energetically favorable arrangement is that in which the particles are joined together to form chains parallel to the magnetic flux lines. As the magnetic flux increases, these chains aggregate into columns which, by reducing the mobility of the magnetorheological fluid, are responsible for the macroscopic increase of the viscous features of the magnetorheological fluid itself and for its apparent solid state. The viscous resistance of the magnetorheological fluids is directly influenced by the magnetic flux which crosses them.

The above-described actuator 17 displays many advantages, because the performances being equal it is more cost-effective and more compact than both a balanced pneumatic/hydraulic actuator and an electric actuator. Furthermore, in virtue of its simple construction, the above-described actuator 17 is accurate, tough and simple to be controlled. In other words, the above-described actuator 17 is a linear actuator which allows to maintain the advantages given by the non-balanced pneumatic actuation system, i.e. low cost and simple use, without however settling for the simple on-off control which is typical of this technology; indeed, in virtue of the rheological control brake 23, it is capable of controlling the movement of the mobile element 19 by acting on the current with circulates in a simple solenoid winding 33. This implies the controllability of the pneumatic system in any position thereof. Furthermore, in virtue of the fact that both the pneumatic driver 20 and the rheological control brake 23 are linear devices (i.e. both work with a linear displacement and not with a rotation), the actuator 17 is extremely integrated, simple to be controlled, highly modular and easy to be maintained.

It is worth emphasizing that the external pipe allows a simpler assembly and possible replacement of the magnetic system without affecting the integrity of the hydraulic system based on the magnetorheological fluids; furthermore, in this manner, the magnetic circuit is always fixed (i.e. is not displaced at every actuation) and this ensures better energy efficiency and less risk of failures.

In virtue of the fact that the electromagnetic field is applied to a limited amount of rheological fluid 26, i.e. only to the rheological fluid 26 contained in the connection pipe 29 which is a minimum part of the rheological fluid 26 which is totally contained in the adjustment chambers 25, the consumed electric power and the electric energy dissipated by the winding 33 are low and the variations of the magnetic field may occur very rapidly. Furthermore, given the small section of the connection pipe 29, it is easier to focus the magnetic field and therefore reach such a tangential off-set voltage in the connection pipe 29 to block the entire circuit and thus block the displacement of the piston 28.

Finally, the external connection pipe 29 allows a simple application of magnetic or electromagnetic systems such as the above-described driving device 30; in this manner, the construction of the rheological control brake 23 is simple and cost-effective.

Obviously, in the light of the many advantages of the above-described actuator 17, such an actuator 17 may be used for any type of driving other than a swirl or tumble system. Furthermore, the above-described actuator 17 may be used to control both linear and rotary drivers by means of appropriate transmissions and leverages of any type.

The invention claimed is:

1. A combined actuator (17) comprising:
   a mobile element (19);
   a driver (20) for displacing the mobile element (19) along a path (21); and
   a rheological control brake (23), which is mechanically coupled to the mobile element (19) to adjust the displacement of the mobile element (19) along the path (21);
   wherein the rheological control brake (23) comprises:
   at least two contiguous adjustment chambers (25);
   a magnetorheological fluid (26) contained in the two adjustment chambers (25);
   at least one sliding piston (28), which tightly separates the two adjustment chambers (25) and is mechanically connected to the mobile element (19);
   at least one external connection pipe (29), which reciprocally connects the two adjustment chambers (25) and is arranged outside the two adjustment chambers (25); and
   a driving device (30) which is coupled to the external connection pipe (29) so as to apply a variable magnetic field to the magnetorheological fluid (26) contained in the external connection pipe (29) for varying the viscosity of the magnetorheological fluid (26) between a minimum value, at which the rheological fluid (26) may freely flow through the external connection pipe (29) and thus allows the sliding of the piston (28), and a maximum value, at which the magnetorheological fluid (26) cannot flow through the external connection pipe (29) and thus prevents the sliding of the piston (28);
   wherein the driving device (30) comprises;
   a ferromagnetic core (31), which is open-ring-shaped and has an interruption defining a gap (32) in which the external connection pipe (29), is arranged;
   at least one winding (33) which is coupled to the ferromagnetic core (31); and
   an electric generator (34) connected to the winding (33) to make an electric current of adjustable intensity circulate in the winding (33).

2. A combined actuator (17) according to claim 1, wherein the external connection pipe (29) is formed by non-magnetic material.

3. A combined actuator (17) according to claim 1, wherein the open-ring-shaped ferromagnetic core (31) is arranged about the adjustment chambers (25).

4. A combined actuator (17) according to claim 3, wherein the ferromagnetic core (31) and the adjustment chambers (25) have a circular cross section.

5. A combined actuator (17) according to claim 1 and comprising:
   a sensor (40) which detects the position of the mobile element (19); and
   a control unit (39) which is connected to the sensor (40) and controls the driving device (30) to feedback control the position of the mobile element (19).

6. A combined actuator according to claim 5, wherein the sensor (40) is coupled to the mobile element (19) and directly detects the position of the mobile element (19) itself.

7. A combined actuator according to claim 5, wherein the sensor (40) is coupled to a control member which receives the motion from the mobile element (19) and indirectly detects the position of the mobile element (19) itself.

8. A combined actuator (17) according to claim 1, wherein the driver (20) is a pneumatic cylinder.

9. A combined actuator (17) according to claim 1, wherein the driver (20) is a hydraulic cylinder.

10. An intake manifold (3) with a choking device (13) for an internal combustion engine (1) provided with a number of cylinders (2); the intake manifold (3) comprises for each cylinder (3) an intake pipe (7), which is adapted to connect the intake manifold (3) to the cylinder (2); the choking device (13) comprises for each intake pipe (7) a choking valve (14), which is adapted to vary the air introduction section through the intake pipe (7), and a combined actuator (17), which is adapted to actuate the choking valves (14) and comprises:
    a mobile element (19);
    a driver (20) for displacing the mobile element (19) along a path (21); and
    a rheological control brake (23), which is mechanically coupled to the mobile element (19) to adjust the displacement of the mobile element (19) along the path (21);
    wherein the rheological control brake (23) comprises:
    at least two contiguous adjustment chambers (25);
    a magnetorheological fluid (26) contained in the two adjustment chambers (25);
    a sliding piston (28), which tightly separates the two adjustment chambers (25) and is mechanically connected to the mobile element (19);
    at least one external connection pipe (29), which reciprocally connects the two adjustment chambers (25) and is arranged outside the two adjustment chambers (25); and
    a driving device (30) which is coupled to the external connection pipe (29) so as to apply a variable electromagnetic field to the magnetorheological fluid (26) contained in the external connection pipe (29) for varying the viscosity of the magnetorheological fluid (26) between a minimum value, at which the magnetorheological fluid (26) may freely flow through the external connection pipe (29) and thus allows the sliding of the piston (28), and a maximum value, at which the magnetorheological fluid (26) cannot flow through the external connection pipe 29 and thus prevents the sliding of the piston (28;
    wherein the driving device (30) comprises:
    a ferromagnetic core (31), which is open-ring-shaped and has an interruption defining a gap (32) in which the external connection pipe (29) is arranged;
    at least one winding (33) which is coupled to the ferromagnetic core (31); and
    an electric generator (34) connected to the winding (33) to make an electric current of adjustable intensity circulate in the winding (33).

11. An intake manifold (3) according to claim 10, wherein the open-ring-shaped ferromagnetic core (31) is arranged about the adjustment chambers (25).

12. An intake manifold (3) according to claim 10, wherein the choking device (13) is of the swirl type.

13. An intake manifold (3) according to claim 10, wherein the choking device (13) is of the tumble type.

* * * * *